(12) United States Patent
Manfredotti et al.

(10) Patent No.: US 8,579,589 B2
(45) Date of Patent: Nov. 12, 2013

(54) MECHANISM FOR ATTENUATING TORQUE PULSATIONS BETWEEN AN ENGINE AND A ROTORCRAFT ROTOR DRIVEN BY THE ENGINE

(75) Inventors: Thomas Manfredotti, La Colle sur Loup (FR); Jerome Chemin, Marseilles (FR)

(73) Assignee: Eurocopter, Marignane Cedex (FR)

( * ) Notice: Subject to any disclaimer, the term of this patent is extended or adjusted under 35 U.S.C. 154(b) by 667 days.

(21) Appl. No.: 12/897,184

(22) Filed: Oct. 4, 2010

(65) Prior Publication Data

US 2011/0085889 A1  Apr. 14, 2011

(30) Foreign Application Priority Data

Oct. 14, 2009  (FR) ...................................... 09 04921

(51) Int. Cl.
*F03D 7/02* (2006.01)
(52) U.S. Cl.
USPC .............................. 416/52; 416/145; 416/500
(58) Field of Classification Search
USPC ................. 416/18, 51, 52, 53, 500, 144, 145; 415/119
See application file for complete search history.

(56) References Cited

U.S. PATENT DOCUMENTS

| 2,313,206 | A | * | 3/1943 | Sarazin | ............................ 74/604 |
| 3,372,758 | A | * | 3/1968 | Jenney | ........................... 416/103 |
| 4,281,967 | A | * | 8/1981 | Mouille et al. | ................. 416/145 |
| 5,639,214 | A | * | 6/1997 | Guimbal | ........................ 416/145 |
| 5,934,424 | A | | 8/1999 | Hosek et al. | |
| 6,494,680 | B2 | * | 12/2002 | Cardin | ........................... 416/145 |

FOREIGN PATENT DOCUMENTS

EP  102004047854 A1  4/2006
GB  2397360 A  7/2004

OTHER PUBLICATIONS

International Search Report and Written Opinion; Application No. FR 09 04921; dated May 31, 2010.

* cited by examiner

*Primary Examiner* — Dwayne J White
(74) *Attorney, Agent, or Firm* — Brooks Kushman P.C.

(57) ABSTRACT

The invention provides a mechanism for attenuating torque pulsations between an engine (2) and a rotor (1) of a rotorcraft. Torsion means (5) are interposed between the driving and driven shafts and comprise a torsion shaft (6) axially engaged with the drive shaft (3) and the driven shaft (4) an inlet shaft (9) and an outlet shaft (10) respectively engaged with the drive and driven shafts (3, 4) a lever system (7) that extends radially relative to the torsion shaft (6) and that has the inlet and outlet shafts (9, 10) hinged thereto via points (11, 12) that are spaced apart; and a mass (8) carried by said lever arm (7) at its free end (13) radially farthest away from the axis along which the torsion shaft (6) extends.

10 Claims, 4 Drawing Sheets

MECHANISM FOR ATTENUATING TORQUE PULSATIONS BETWEEN AN ENGINE AND A ROTORCRAFT ROTOR DRIVEN BY THE ENGINE

CROSS REFERENCE TO RELATED APPLICATION

This application claims the benefit of application no. FR 09 04921, filed Oct. 14, 2009, the disclosure of which is incorporated herein by reference.

FIELD OF THE INVENTION

The present invention relates to the field of rotorcraft, and more particular to means for enabling an engine member, and in particular a diesel engine, to drive rotation of a rotor with which the rotorcraft is fitted. The invention provides a mechanism for attenuating torque pulsations between such an engine and the rotor it drives in rotation.

BACKGROUND OF THE INVENTION

Rotorcraft are fitted with at least one rotor that is driven by an engine, in particular a diesel engine. The rotary connection between the engine and the rotor takes place via a junction between a drive shaft engaged with the engine and a driven shaft engaged with the rotor. The engagement of the drive and/or driven shafts respectively with the engine and with the rotor may be direct engagements or indirect engagements via mechanisms, such as transmission mechanisms in particular. Such intermediate mechanisms may be interposed between the drive and/or driven shaft(s) and the corresponding members with which they are respectively engaged.

A general problem occurs that lies in torque pulsations that are naturally induced between the drive shaft and the driven shaft. Such torque pulsations are particularly large in rotorcraft because of the weight of such aircraft that needs to be compensated in order to lift them and/or move them. More particularly, diesel engines can be used to drive such rotors, and by their architecture they generate very large torque pulsations. The spontaneous combustion of fuel in the combustion chamber gives rise to a sudden increase in pressure that induces instantaneous torque peaks with a spectral response that presents high levels of harmonics up to harmonics of high order. Such torque pulsations transmitted via the transmission system between the engine and the rotor tend to give rise to fatigue failures of the members making up the transmission system.

In the field of transmission between an engine and a member that is to be driven in rotation, various solutions are known for attempting to attenuate such torque pulsations.

A first solution consists in interposing a flywheel of large mass between the drive shaft and the driven shaft in order to attenuate torque pulsations. Such a solution presents the advantage of being simple to implement, but also the drawback of increasing the overall size and weight of the transmission system, and this needs to be avoided in the field of rotorcraft.

A second solution consists in interposing a torsion mechanism between the drive shaft and the driven shaft. Commonly, such a mechanism makes use of the ability of one of the shafts, and more particularly the drive shaft, to accommodate twisting by giving it a certain amount of flexibility. The torsion shaft enables torque pulsations to be absorbed by setting its resonant frequency well below the frequency of the excitation that gives rise to the torque pulsations. Such a solution presents the advantage of being simple to implement, but it requires the use of a shaft presenting a length and/or a weight that makes it unacceptable for use in the field of rotorcraft.

SUMMARY OF THE INVENTION

One object of the present invention is to provide a mechanism for attenuating torque pulsations between an engine and a rotorcraft rotor driven in rotation by the engine, the mechanism having a size and weight that make it suitable for use in rotorcraft. It is particularly desirable for such a mechanism to be simple in structure, light in weight, and compact in order to make it acceptable for use in an aircraft, in particular a rotorcraft, that is to be lifted by means of at least one rotor and caused to move through the air. Nevertheless, such a mechanism must be robust so as to be long-lasting in spite of the high levels of torque transmitted between the engine and the rotor. Such a mechanism must also be capable of being easily mounted in the transmission system between the engine and the rotor it drives, and it must make it easy to perform any maintenance operations that might be required, whether on the mechanism itself or on other members making up the transmission system.

The mechanism of the present invention includes a mechanism for attenuating torque pulsations between an engine, in particular a diesel engine, and a rotorcraft rotor driven in rotation by the engine. In one embodiment, the mechanism comprises torsion means that are interposed in coaxial engagement between a drive shaft and a driven shaft for driving the rotor. The drive shaft is a shaft that is in communication with the engine for driving it in rotation, either directly or indirectly via associated transmission members, e.g. such as transmission mechanisms. The drive shaft is coaxially engaged via the torsion means with the driven shaft for driving the rotor. The driven shaft is a shaft that is in communication with a rotor shaft, either directly or indirectly via associated transmission members.

As used herein, the term "coaxial" means two elements which have a common axis, said elements being aligned or one element surrounding another element.

The mechanism of the present invention is more particularly recognizable in that said torsion means comprise an intermediate torsion shaft suitable for being axially engaged both with the drive shaft and with the driven shaft by being interposed between them. The torsion shaft is a shaft that is suitable for deforming in twisting over a determined range relative to the torque transmitted between the drive shaft and the driven shaft. This twisting of the torsion shaft occurs in particular under the effect of the drive shaft setting the driven shaft into rotation and of the levels of torque that result therefrom.

The torsion means further comprise an inlet shaft and an outlet shaft that are provided with coaxial engagement means respectively with the drive shaft and with the driven shaft. Said coaxial engagements of the inlet and outlet shafts may equally well be direct engagements and/or indirect engagements via the torsion shaft. More particularly, the engagement means with which the inlet and outlet shafts are respectively provided are suitable for co-operating with complementary engagement means fitted either respectively to the drive shaft and the driven shaft, or to the torsion shaft, or indeed both respectively to the drive shaft and the driven shaft and the torsion shaft.

The torsion means further comprise at least one lever system comprising a rigid lever arm extending radially from the torsion shaft. More particularly, the lever arm is formed by a rigid branch extending radially to the common axis of the torsion shaft, the inlet shaft, and the outlet shaft. The inlet and outlet shafts are hinged to the lever arm at points that are spaced apart. The inlet and outlet shafts engage with each other via the lever arm to which they are hinged, being suitable for turning about their axes under the effect of the lever arm turning about the axis of the inlet, outlet, and torsion shafts.

The torsion means also comprise at least one mass carried by said lever arm at its free end. The free end corresponds to the end of the lever arm that is radially remote from the axis along which the torsion shaft extends and from the hinge points with the inlet and outlet shafts. Ideally, the free end of the lever arm is situated radially as far away as possible from the common axis of the inlet, outlet, and torsion shafts.

More specifically, one of the inlet and outlet shafts is hinged to the end of the lever arm that is opposite from its free end carrying the mass. The other of the inlet and outlet shafts is hinged between said two ends of the lever arm. It should be observed that the separation distance between the ends of the torsion shaft engaged respectively with the inlet shaft and with the outlet shaft is adapted so as to allow relative displacement between these two ends of the torsion shaft.

Under the effect of centrifugal force and the force of inertia as induced by the drive shaft being set into rotation, the mass serves to give rise to phase shifts between the inlet shaft and the outlet shaft as a function of the torque pulsations induced by the resistance offered by the driven shaft against being driven in rotation by the drive shaft. These phase shifts are absorbed by the torsion shaft. The force multiplication effect produced by the lever system serves to limit the mass that needs to be used to achieve absorption of given induced torque pulsations. In spite of the small mass used for causing the torsion shaft to twist, it nevertheless compensates the force of the torsion shaft in phase opposition by making use of the lever effect provided by the lever system. As a function of the centrifugal force and the force of inertia induced by setting the drive shaft into rotation, the mass of effect that is amplified by the lever system spontaneously causes torque pulsations to be absorbed. More particularly, the force transmissions induced by the torque pulsations at a given frequency are absorbed while not affecting the transmission of torque between the drive shaft and the driven shaft. Using the lever system makes it possible to reduce the mass for the torsion shaft acting to absorb the torque pulsations, such that there is no need for the mass and the extent of said torsion shaft to be unacceptable for an application in the field of rotorcraft. More particularly, the lever system serves to increase the stiffness of the torsion shaft and consequently to restrict its extension, with the advantage of making it suitable for use in the field of rotorcraft. The radial extent of the lever arm and its pivoting movement about the common axis of the torsion shaft, the inlet shaft, and the outlet shaft, give rise to the mass rocking tangentially relative to said common axis, while avoiding giving rise to unbalance that would affect the equilibrium of the forces involved when driving the rotor.

The general result obtained may be summarized by the following function:

$$K = r^2 \times M \times w^2$$

in which:
K corresponds to the stiffness offered by the torsion shaft;
r corresponds to the lever ratio obtained by the lever system, and in particular by the lever arm;
M corresponds to the mass; and
w corresponds to the excitation frequency induced by the torque pulsations.

The lever ratio defined between the separation distance of the hinge point of one of the inlet and outlet shafts and the anchor point of the mass, and the separation distance between the hinge point of the inlet and outlet shafts on the lever arm preferably lies in the range 8 to 12. Ideally, this lever arm ratio is less than 10, in order to make it easy to adapt the mechanism to any harmonic of the engine, in particular of the diesel engines commonly used in the field of rotorcraft.

In an improved embodiment, the inlet shaft or the outlet shaft that is hinged to the lever arm between its said ends is in hinged connection with said lever arm via a link. This embodiment presents the advantage of avoiding a statically undetermined configuration for the mechanism. The pivoting of the mass and the hinged junction to the corresponding shaft via the link acts under the effect of centrifugal force to obtain greater stiffness for this pivoting and consequently makes it possible to further reduce the overall size of the torsion shaft, in particular in terms of diameter, for given stiffness.

The specific result obtained may be expressed by the following function:

$$\omega = \sqrt{\frac{L+r}{L}\Omega^2 + \frac{Kl^2}{mL^2R^2}}$$

in which:
K corresponds to the angular stiffness of the torsion shaft;
m corresponds to the mass;
$\overline{\Omega}$ corresponds to the angular speed of rotation;
ω corresponds to the filtering frequency at which transmission is zero;
r corresponds to the separation distance between the common axis of the inlet, outlet, and torsion shafts and the hinge point of the inlet or outlet shaft that is situated between the ends of the lever arm;
L corresponds to the length of the lever arm:
l corresponds to the separation distance between the respective hinge points of the inlet shaft and of the outlet shaft on the lever arm, said distance being measured orthogonally to the general direction in which the link extends; and
R corresponds to the radius of the corresponding shaft engaged between the two ends of the lever arm by means of the link.

By way of example, each of the inlet and outlet shafts carries at least one tab for receiving a connection finger hinged to the lever arm. It can be understood that for the shaft hinged to the lever arm by means of the link, the hinge finger that is associated therewith co-operates with an additional member of said link so as to end up by obtaining its hinge connection with the lever arm.

The tabs may be formed by being molded together with the corresponding inlet or outlet shaft. In an analogous variant embodiment, the tabs may be derived from end rings or shoulders with which the inlet shaft and the outlet shaft are respectively provided in order to produce the tabs.

Between its ends, the lever arm may form an angle lying in the range 90° to 180°. Ideally, in order to avoid making the mechanism excessively large in a radial direction, the lever arm forms a 90° bend between its ends, the corresponding inlet and/or outlet shafts being hinged in the zone of the bend. Taken together, the arrangement of the lever arm with a 90° angle between its ends and a said lever ratio of less than 10 makes it possible to restrict the overall radial size of the mechanism as well as possible.

The mass is advantageously made up of a plurality of flyweights that are radially uniformly distributed, i.e. circumferentially uniformly distributed about the common coaxial axis along which the inlet, outlet, and torsion shafts extend. These flyweights are individually carried by respective individual lever arms to which the inlet and outlet shafts are hinged. The effect of centrifugal force and of the force of inertia is radially distributed over the inlet and outlet shafts thus making it possible to balance the forces induced on the torsion shaft in order to damp torque pulsations, thereby also serving to avoid unbalance.

In an elementary embodiment providing both an effect of attenuating torque pulsations and balanced transmission of forces to the torsion shaft, and that is satisfactory for producing a mechanism of small radial size, the flyweights and the individual lever arms are preferably three in number, being radially uniformly distributed at 120° intervals about the common coaxial axis along which the inlet, outlet, and torsion shafts extend.

BRIEF DESCRIPTION OF THE DRAWINGS

Embodiments of the present invention are described with reference to the figures of the accompanying sheets, in which.

DETAILED DESCRIPTION OF THE PREFERRED EMBODIMENT

Figure 1:
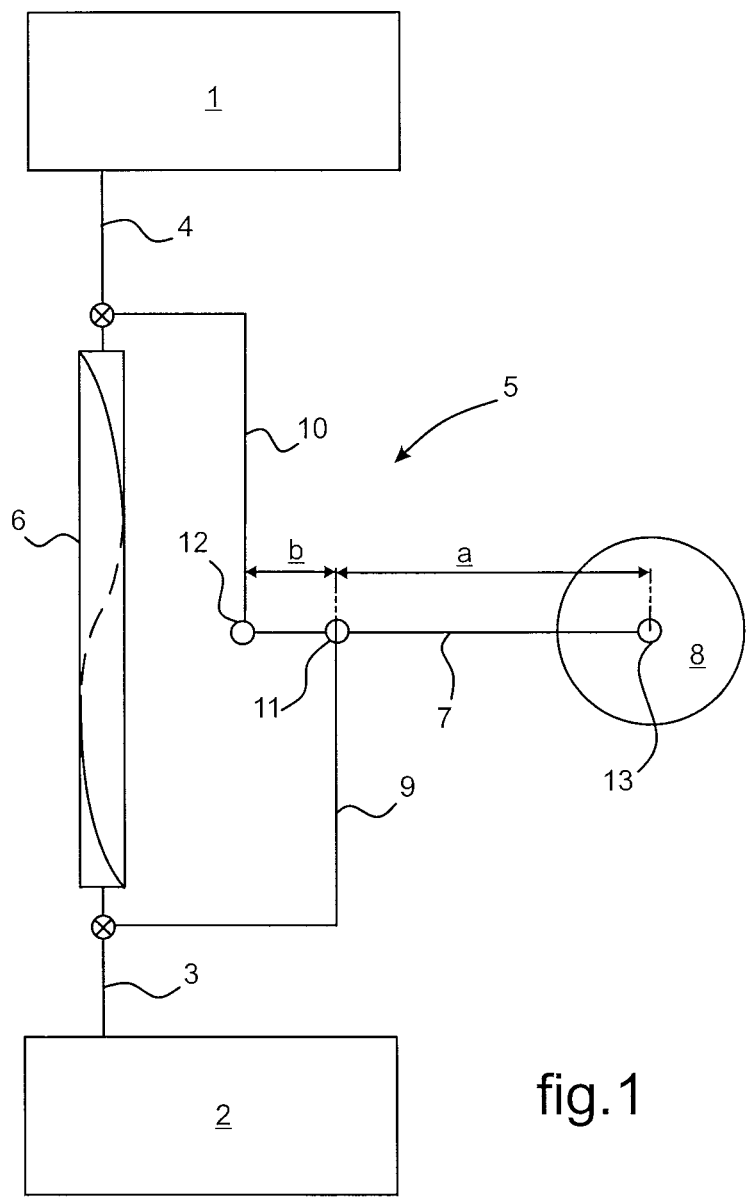
FIG. 1 is a diagrammatic representation of a first mechanism of the present invention.

FIG. 1 shows a mechanism for fitting to a rotorcraft, being interposed between a rotor 1 and an engine 2, in particular a diesel engine, for driving the rotor 1 in rotation. The mechanism is for damping torque pulsations as induced when the rotor 1 is rotated by the engine 2.

A drive shaft 3 that is engaged with the engine 2 communicates with a driven shaft 4 that is engaged with the rotor 1 via torsion means 5 that are interposed between them. The torsion means 5 associate a torsion shaft 6 that is engaged both with the drive shaft 3 and with the driven shaft 4, and a lever arm 7 for spontaneously causing the torsion shaft 6 to be deformed in twisting under the effect of the induced torque pulsations. The movement of the lever arm 7 in response to the induced torque pulsations is caused spontaneously by a mass 8 that is movable under the effect of the force of inertia. An inlet shaft 9 and an outlet shaft 10 are each engaged at one respective end with the torsion shaft and/or the drive shaft 3 and the driven shaft 4, respectively. The inlet and outlet shafts 9 and 10 are also hinged at their other ends to the lever arm 7 at respective spaced-apart points 11 and 12. The lever effect caused by the mass 8 under the effect of centrifugal force and the force of inertia serves to amplify the force deforming the torsion shaft 6 so as to absorb the torque pulsations that are induced when the rotor 1 is rotated by the engine 2. This amplification, which depends on centrifugal force and the force of inertia in proportion to the speed and acceleration with which the rotor 1 is driven in rotation, acts spontaneously to match requirements for absorbing the induced torque pulsations at the instantaneous drive speed of the rotor 1 and at a given harmonic of the engine 2.

In the embodiment shown, the outlet shaft 10 is hinged to one of the ends 12 of the lever arm 7, the mass 8 is anchored to the other end 13 of the lever arm 7, and the inlet shaft 9 is hinged between the two ends 12 and 13 of the lever arm. The lever arm 7 extends in a single direction forming an angle of 180° between its ends. The separation distance a between the anchor point 13 for the mass 8 and the hinge point 11 for the inlet shaft 9 to the lever arm 7 is greater than the separation distance b between the respective hinge points 11 and 12 of the inlet and outlet shafts 9 and 10 to the lever arm 7. This difference in distance is defined so that the ratio r equal to a/b is less than 10. The resistance to twisting deformation of the torsion shaft 6 is equivalent to the square of the ratio r multiplied by the mass 8 and further multiplied by the square of the excitation frequency induced by the torque pulsations.

Figure 2:
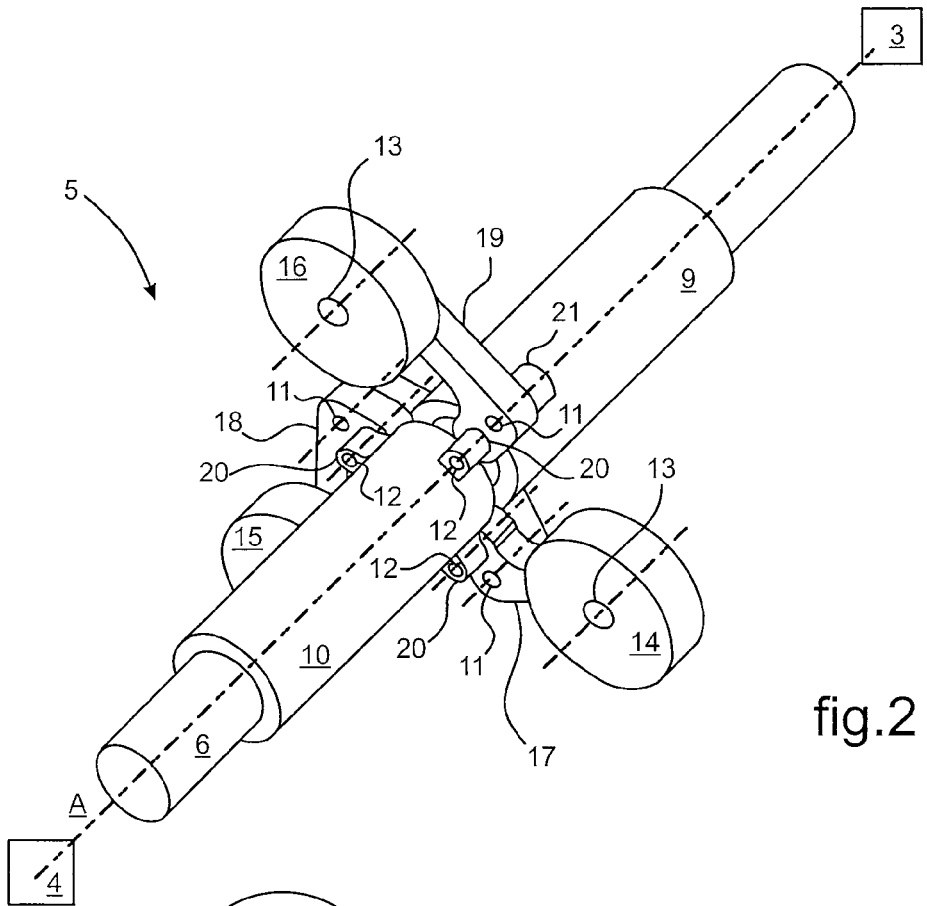
FIGS. 2 and 3 are respectively a perspective view and an end view of a first embodiment of a mechanism of the present invention.
Figure 3:
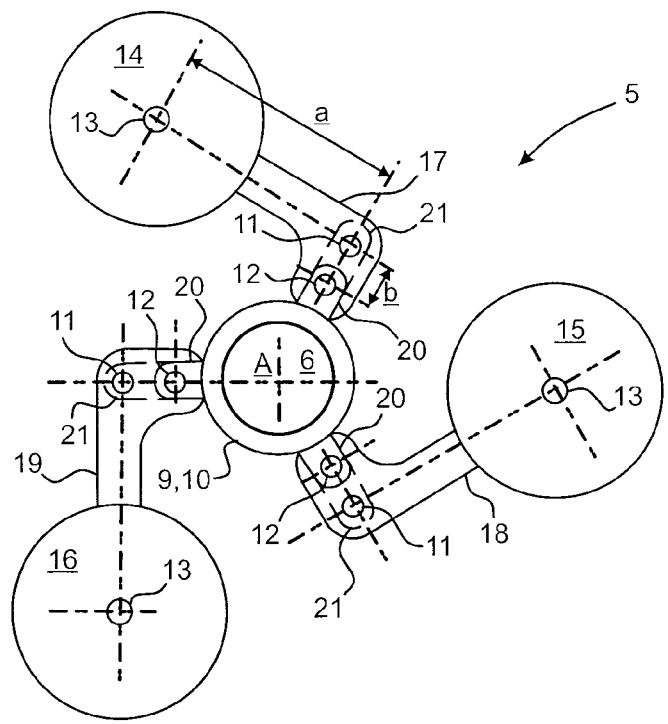

In FIGS. 2 and 3, the torsion means 5 of the mechanism are shown in isolation from the drive and driven shafts. Such a mechanism is easily implanted, interposed between the drive shaft 3 and the driven shaft 4. The torsion shaft 6 is mounted in coaxial engagement on the axis A with the inlet and outlet shafts 9 and 10. The mass 8 is subdivided into three flyweights 14, 15, and 16 that are carried by respective individual lever arms 17, 18, and 19, all being located at the same radial distance from the common axis A of the inlet, outlet, and torsion shafts 9, 10, and 6. Each of the inlet and outlet shafts 9 and 10 carries respective assembly tabs 20 and 21 to which the individual lever arms 17, 18, and 19 are hinged, which arms are uniformly distributed radially i.e. circumferentially at 120° intervals about said common axis A. In order to limit the radial size of the mechanism, the individual lever arms 17, 18, and 19 form an angle of 90° between their ends. The anchor points 13 of the flyweights 14, 15, and 16 are situated at the ends of the individual lever arms 17, 18 and 19 that are distal relative to said common axis A. The hinge points 12 with the outlet shaft 10 are situated at the opposite ends of the individual lever arms 17, 18, and 19 that are proximal relative to said common axis A. The hinge points 11 with the inlet shaft 9 are situated in the zones of the 90° bends in the individual lever arms 7.

Figure 4:
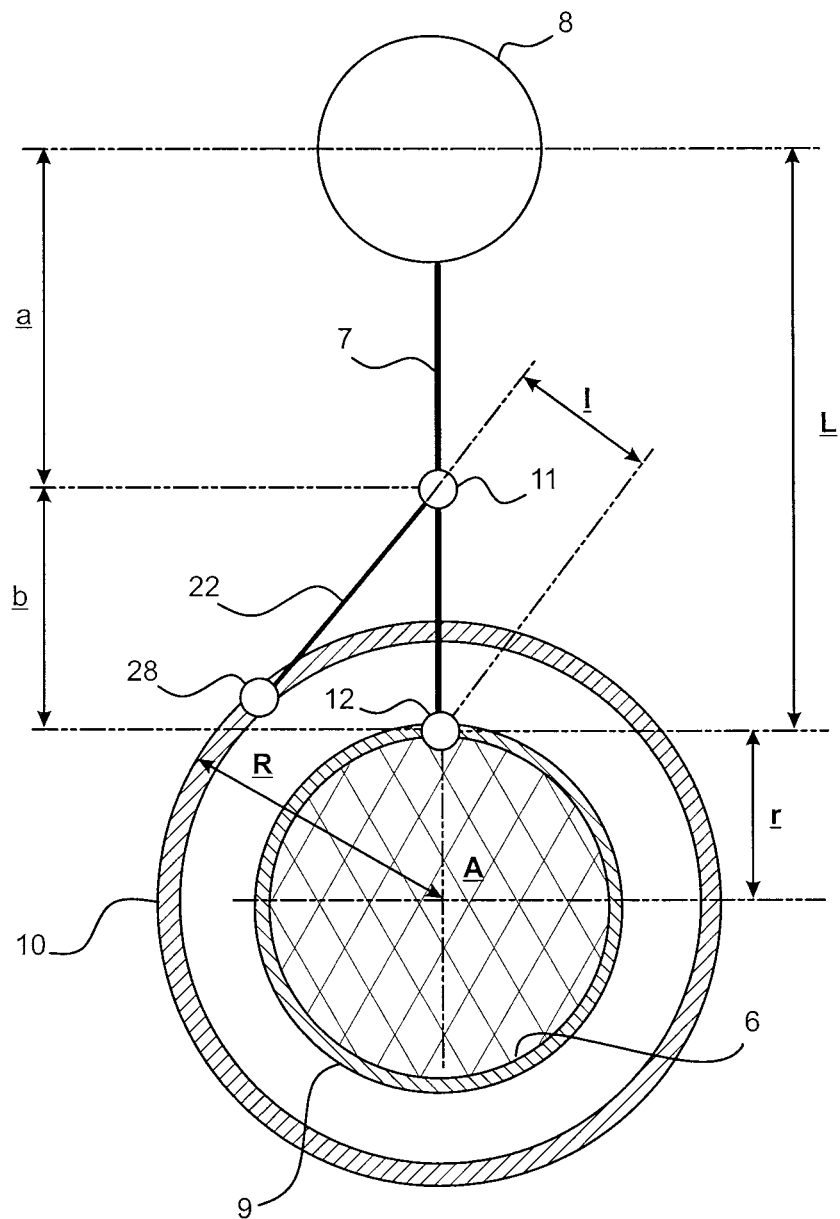
FIG. 4 is a diagrammatic end representation of a second mechanism of the present invention.
Figure 6:
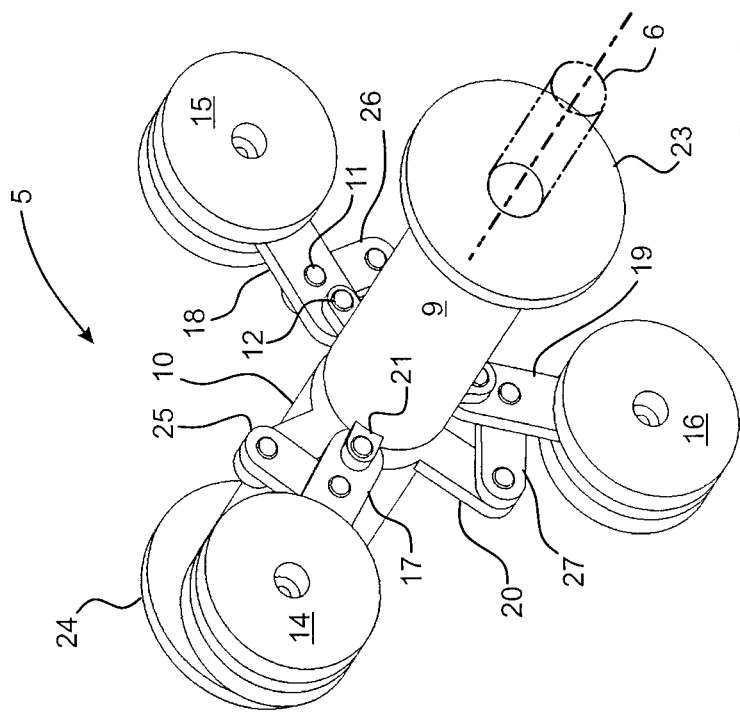
FIGS. 5 and 6 are respectively an end view and a perspective view of a second embodiment of a mechanism of the present invention, of the type shown in FIG. 4.
Figure 5:
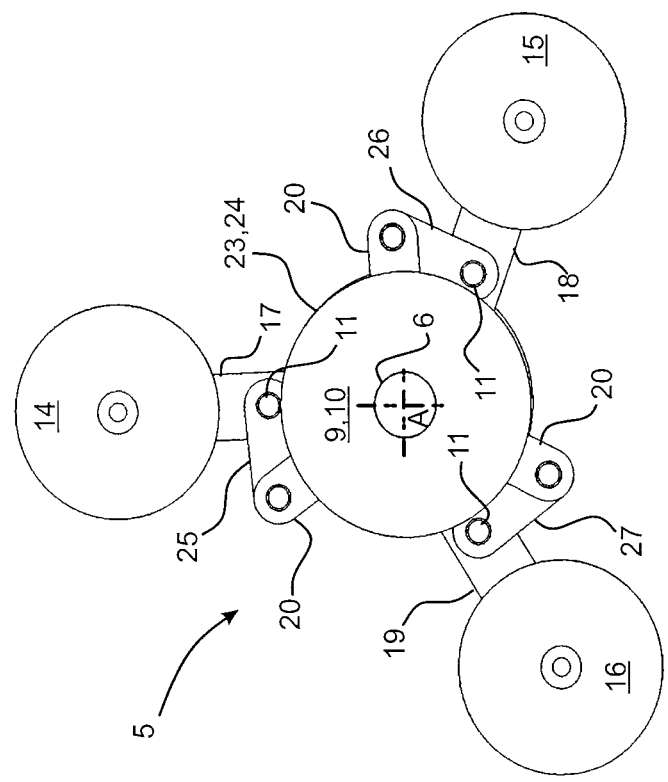

In FIGS. 4 to 6, the mechanism shown is analogous to that shown in FIG. 3. In FIG. 4, and unlike the embodiment shown in FIGS. 2 and 3, the outlet shaft 10 is hinged to the lever arm 7 via a link 22. The link 22 is hinged to the outlet shaft 10 at one of its ends 28 and to the lever arm 7 at its other end. These arrangements seek mainly to increase the stiffness of the lever system for the ultimate purpose of better restricting the diameter of the torsion shaft 6 and thus restricting at least the radial size of the mechanism if not also its coaxial size. These arrangements also make it possible to reduce the ratio of the separation distance A between the anchor point 13 of the mass 8 and the hinge point 11 of the outlet shaft 10 to the lever arm 7 to the separation distance b between the respective hinge points 11 and 12 of the inlet and outlet shafts 9 and 10 to the lever arm 7. The extent of the lever arm 7 can thus be reduced, thereby giving a reduction in the size of the mechanism. It can be understood that the connections of the inlet and outlet shafts to the lever arm could equally well be inverted, e.g. as in the embodiment shown in FIGS. 2 and 3.

The dimensions corresponding to L, l, r, and R are identified in FIG. 4 and the following function applies:

$$\omega = \sqrt{\frac{L+r}{L}\Omega^2 + \frac{Kl^2}{mL^2R^2}}$$

In FIGS. 5 and 6, the embodiment shown is analogous to that shown in FIGS. 2 and 3 in that the mass 8 is subdivided into three flyweights 14, 15, 16 that are carried by respective individual lever arms 17, 18, and 19, being located at the same radial distance from the axis A common to the inlet, outlet, and torsion shafts 9, 10, and 6. Each of the inlet and outlet shafts 9 and 10 carriers respective mounting tabs 20, 21 to which the individual lever arms 17, 18, and 19 are hinged, which lever arms are uniformly distributed circumferentially at 120° intervals about said common axis A. The tabs 20 of the outlet shaft 10 are connected to individual links 25, 26, and 27 for the purpose of connecting the outlet shaft 10 to the lever arms 7. The lever system of the mechanism that acts generally to associate a lever arm with a link, preferably acts as shown in the example to associate the individual lever arms 17, 18, and 19 with the individual links 25, 26, and that are associated therewith. The lever arm(s) 7, 17, 18, and 19 of the mechanism extend in a common direction.

Each of the inlet and outlet shafts is fitted with engagement means 23, 24 respectively engaging a drive shaft and a driven shaft for driving the rotor of the rotorcraft. In the embodiment shown, these engagement means 23, 24 are formed by abutment plates.

What is claimed is:

1. A mechanism for attenuating torque pulsations between an engine and a rotorcraft rotor driven in rotation by the engine, the mechanism comprising torsion means interposed in coaxial engagement between a drive shaft and a driven shaft for driving the rotor, wherein said torsion means comprise:
    a torsion shaft provided with coaxial engagement means with the drive shaft and with the driven shaft;
    an inlet shaft and an outlet shaft provided with coaxial engagement means respectively with the drive shaft and with the driven shaft;
    at least one lever system comprising a rigid lever arm extending radially to the torsion shaft and having the inlet and outlet shafts hinged thereto at spaced-apart points; and
    at least one mass carried by said lever arm at its free end radially distant from the axis on which the torsion shaft extends and from said hinge points of the inlet and outlet shafts.

2. A mechanism according to claim 1, wherein one of the inlet and outlet shafts is hinged to an end of the lever arm opposite from its free end carrying the mass, and wherein the other one of the inlet and outlet shafts is hinged between the two ends of the lever arm.

3. A mechanism according to claim 1, wherein an lever ratio (r) defined by the separation distance (a) of the hinge point of one of the inlet and outlet shafts and the anchor point of the mass and by the separation distance (b) between the hinge points of the inlet and outlet shafts on the lever arm lies in the range 8 to 12.

4. A mechanism according to claim 1, wherein the shaft that is hinged to the lever arm between its ends has a hinge connection with said lever arm via a link.

5. A mechanism according to claim 1, wherein each of the inlet and outlet shafts carries at least one tab for receiving a connection finger hinged with the lever arm.

6. A mechanism according to claim 1, wherein the lever arm forms an angle lying in the range 90° to 180° between its ends.

7. A mechanism according to claim 6, wherein the lever arm forms an angle of 90° between its ends for a said lever ratio (r) less than 10.

8. A mechanism according to claim 1, wherein the mass is made up of a plurality of flyweights that are uniformly distributed radially about the axis (A) along which the torsion shaft extends, being individually carried by respective individual lever arms to which the inlet and outlet shafts are hinged.

9. A mechanism according to claim 8, wherein the flyweights and the individual lever arms are three in number and are uniformly distributed at 120° intervals relative to the axis (A) along which the torsion shaft extends.

10. A mechanism according to claim 1, wherein said coaxial engagements of the inlet and outlet shafts respectively with the drive shaft and the driven shaft are constituted equally well by direct engagements and/or by indirect engagements via the torsion shaft.

* * * * *